United States Patent
Casalini

(10) Patent No.: US 7,320,585 B2
(45) Date of Patent: Jan. 22, 2008

(54) DEVICE FOR THE HOT GRANULATION OF THERMOPLASTIC POLYMERS

(75) Inventor: Alessandro Casalini, Mantova (IT)

(73) Assignee: Polimeri Europa S.p.A., Brindisi (IT)

(*) Notice: Subject to any disclaimer, the term of this patent is extended or adjusted under 35 U.S.C. 154(b) by 241 days.

(21) Appl. No.: 10/498,015

(22) PCT Filed: Dec. 5, 2002

(86) PCT No.: PCT/EP02/13785

§ 371 (c)(1),
(2), (4) Date: Jan. 5, 2005

(87) PCT Pub. No.: WO03/053650

PCT Pub. Date: Jul. 3, 2003

(65) Prior Publication Data
US 2005/0123638 A1    Jun. 9, 2005

(30) Foreign Application Priority Data
Dec. 20, 2001 (IT) .......................... MI2001A2708

(51) Int. Cl.
*B29B 9/10* (2006.01)

(52) U.S. Cl. .................. 425/464; 425/67; 425/311; 425/378.1

(58) Field of Classification Search .............. 425/311, 425/378.1, 67, 464
See application file for complete search history.

(56) References Cited

U.S. PATENT DOCUMENTS

| | | | | |
|---|---|---|---|---|
| 3,341,892 A | * | 9/1967 | Mayner | 425/90 |
| 4,179,255 A | * | 12/1979 | Hale | 425/67 |
| 4,606,873 A | | 8/1986 | Biglione et al. | |
| 4,678,423 A | * | 7/1987 | Bertolotti | 425/311 |
| 5,290,496 A | * | 3/1994 | Carduck et al. | 264/142 |

FOREIGN PATENT DOCUMENTS

EP    305 862    3/1989

OTHER PUBLICATIONS

U.S. Appl. No. 10/499,323, Casalini, filed Jan. 26, 2005.*

* cited by examiner

*Primary Examiner*—Yogendra Gupta
*Assistant Examiner*—Marissa W Chaet
(74) *Attorney, Agent, or Firm*—Oblon, Spivak, McClelland, Maier & Neustadt, P.C.

(57) ABSTRACT

Device for the hot granulation of thermoplastic polymers, optionally expandable, which comprises: a) a die (1) containing a series of small plates (6), equipped with a series of extrusion holes, and a plurality of feeding ducts (3) situated inside the die body (2) in correspondence with the perforated small plates (6), lined with a material having a high thermal conductivity (4); b) a cutting chamber comprising a set of spraying nozzles (17) which create a jet of drops of a thermostat-regulating liquid for cooling the cut granules; c) a cutting system comprising a cutting plate (13) supporting a set of knives (15) arranged so that the cutting profile of the knife is radial with respect to the die.

14 Claims, 3 Drawing Sheets

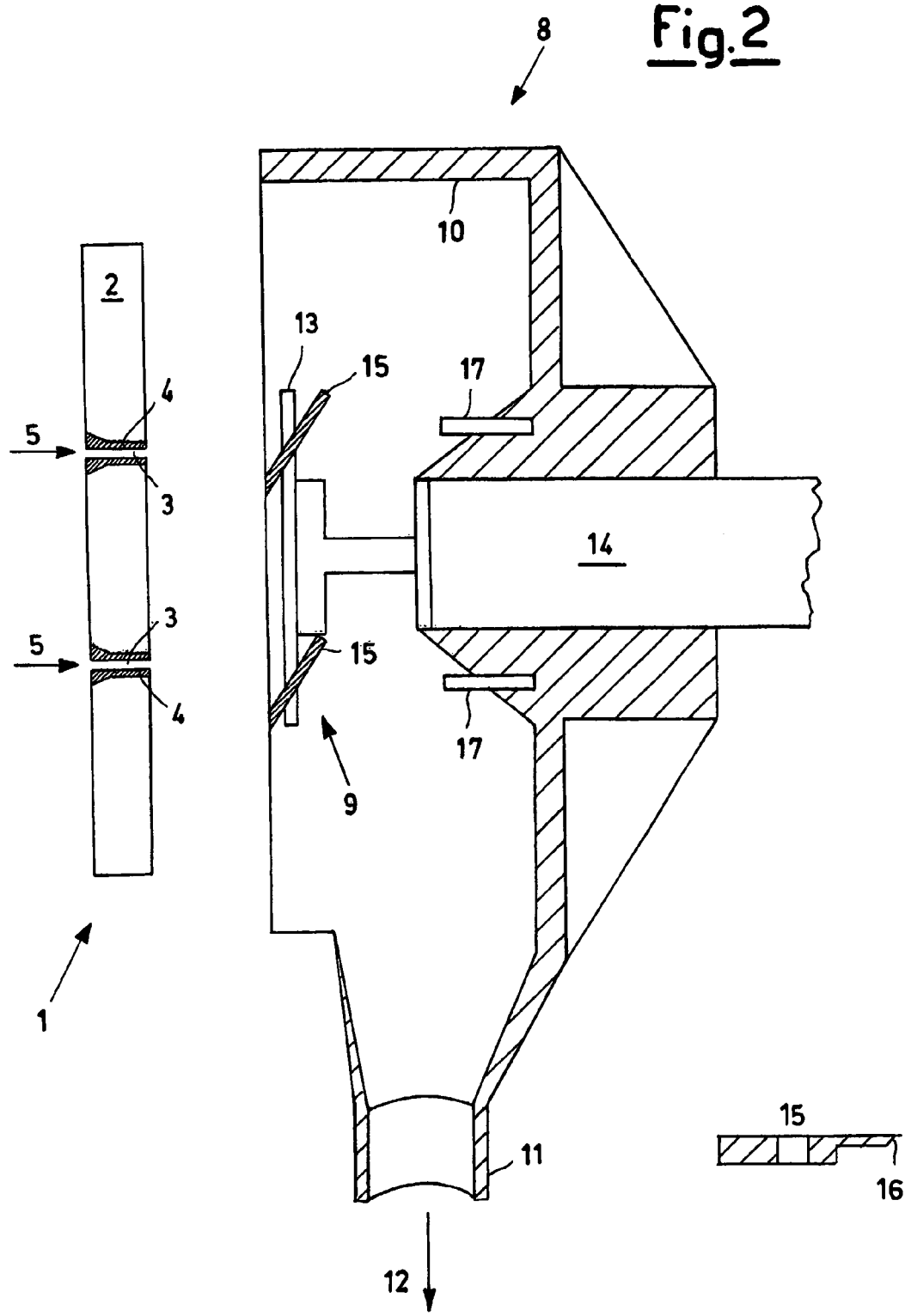

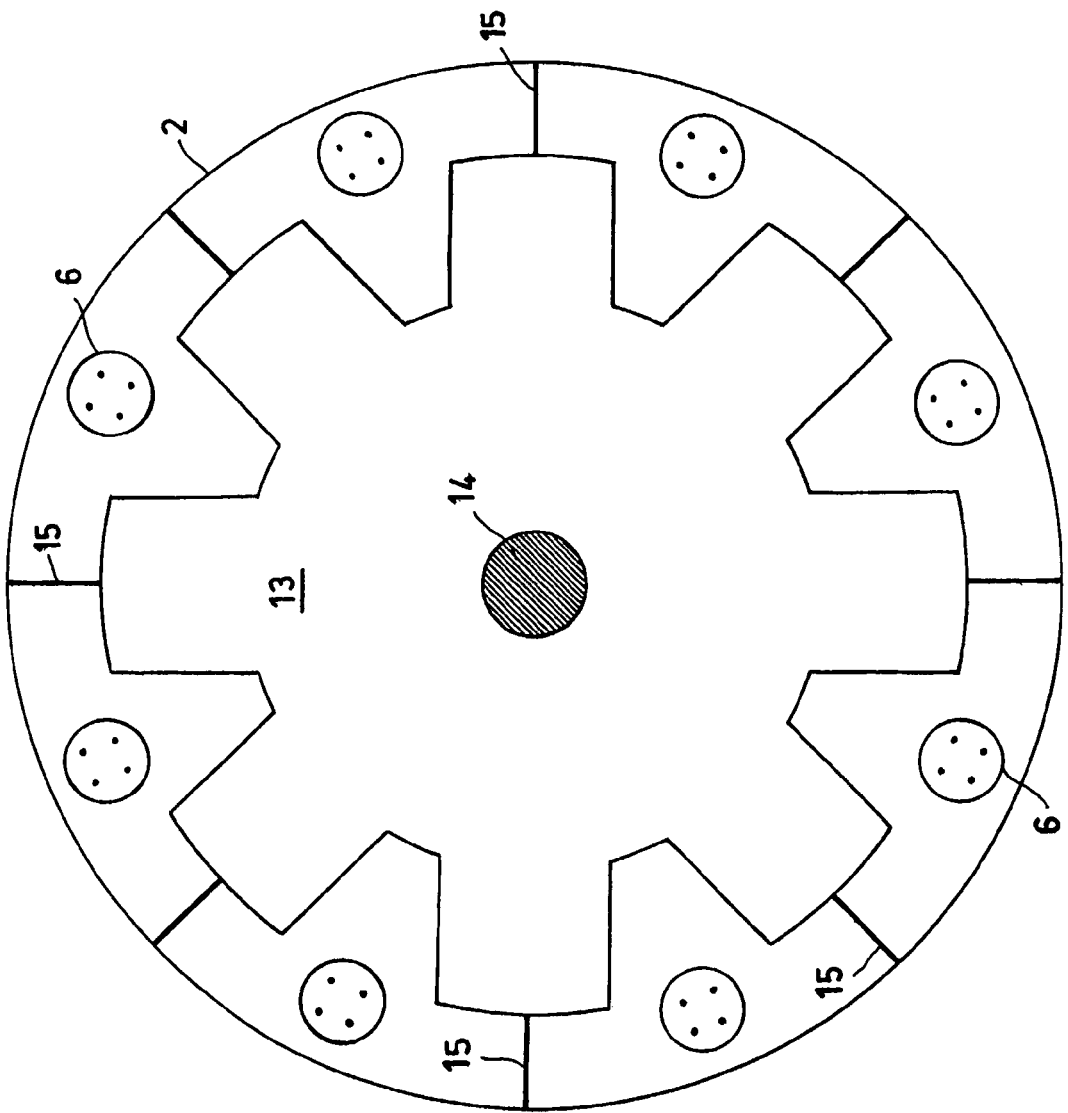

DEVICE FOR THE HOT GRANULATION OF THERMOPLASTIC POLYMERS

Figure 1:
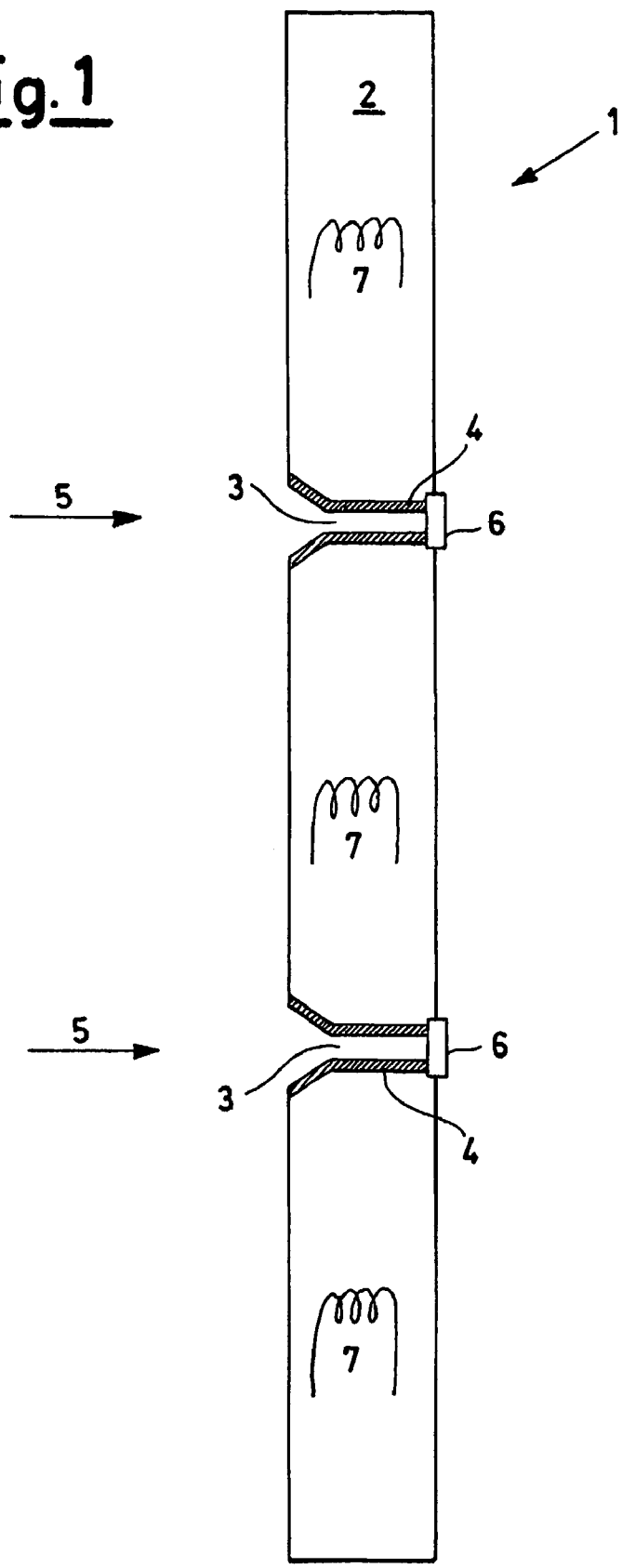

The present invention relates to a device for the hot granulation of thermoplastic polymers.

More specifically, the present invention relates to a device for the hot granulation of thermoplastic polymers, for example vinylaromatic polymers, optionally expandable.

Even more specifically, the present invention relates to a device for the hot granulation of polystyrene and expandable polystyrene.

Devices for the granulation of thermoplastic polymers, known in literature, generally comprise:
a die, consisting of a heated perforated body;
a cutting and collecting chamber of the granules which, for expandable polymers, can be maintained under pressure;
a cutting system essentially consisting of a rotating drive shaft, a blade-holder disk supported on the drive shaft and a positioning device of the blades against the external side of the die;
a feeding and distribution system of a thermostat-regulated fluid, generally water, in the cutting chamber to cool and discharge the cut granules.

The thermoplastic material in the molten state is extruded through the holes of the die, is cut as it leaves the die by the rotating blades and the granules thus obtained are cooled and removed by means of the thermostat-regulated liquid.

Various head cutting granulation devices are known, however, in their practical embodiment they do not completely satisfy technological demands. For example, "dry cutting" granulation devices are known, which create the partialization of the polymeric flow leaving the die by the action of blades and the removal of the granule thus formed due to centrifugal effect, whereas the cooling phase is prevalently obtained with a fluid ring (for example water or air). These devices, however, are not only unable to guarantee high flow-rates, especially in the presence of high viscosity polymers, but are also not suitable for producing granules with reduced dimensions (micro-granules), due to the fact that the centrifugal effect is not adequate for removing the micro-granules from the knives.

Other granulation devices are those known as "underwater cutting" devices which guarantee greater flow-rates than the dry cutting devices but have other disadvantages such as:
high water-polymer thermal exchange, with the consequent necessity of high temperatures in the die or of the cutting water;
possible cavitation phenomena behind the cutting knives if the operating pressure in the cutting chamber is not sufficiently high or if the number of revs is too high;
long and onerous re-starting procedures, due to the stopping and restarting of the granulation caused by drawbacks during the cutting, with a consequent waste of material. In addition, subsequent multiple re-activations are not possible without intervening in the cutting chamber.

Another device known and described in English patent 1,062,307 is that known as "spaghetti cutting" effected under a jet of water which, however, has the following disadvantages:
the granule cut by the spaghetto is strongly oriented and consequently it is extremely difficult to prepare an acceptable product by the complete elimination of the stress;
the granule is cut at atmospheric pressure and is only partly cooled (65-70° C.), it is therefore unsuitable for expandable polymers as it favours the formation of undesired micro-expansions. The processability and structure of these granules are not acceptable;
the cutting system adopted prepares irregular granules as the flow-rate of the extruder can vary in relation to small variations of the functioning conditions, the density of the polymer or flow-rate of the expanding agent (pentane), in the case of expandable polymers (a fact which strongly influences the viscosity of the base). It is not possible in fact to guarantee the regularity of the cut with, for example, contrast elements coupled with the blades capable of opposing any sudden action which tends to remove the edge of the blade itself from the plate;
the feeding channels in the die do not guarantee a uniform temperature of the polymer, causing instability in the extrusion. The temperature of the polymer in contact with the metal is in fact greater than that of the polymer inside and therefore has greater fluidity.

Granulation devices with rigid blade cutting systems are also known, which however not only produce poor-quality granules, but also cause severe wear both to the blades and die as the lubrication between these is effected by a simple film of water and is therefore not very effective.

The object of the present invention is to provide a device for the hot granulation of expandable thermoplastic polymers which overcomes the disadvantages that characterize the devices of the known art and which is therefore capable of guaranteeing high and constant flow-rates of the polymer, i.e. which is capable of maintaining a uniform thermal flow up to the extrusion holes in order to avoid a temperature gradient between the edge and centre of the feeding ducts of the molten polymer, which allows the production of regular granules, of any size, with internal stress which can be easily eliminated, a low wear of the blades and/or die and which can be easily re-started after interruptions.

The Applicant has now found that it is possible to achieve the above object by means of a device for the hot granulation of thermoplastic polymers, optionally expandable, which comprises:

a) a die, consisting of a cylindrical body containing on the outer surface a plurality of small plates, equipped with a plurality of extrusion holes, and a plurality of feeding ducts of the molten polymer, situated inside the cylindrical body in correspondence with and connected to the perforated small plates, lined with a material having a high thermal conductivity;

b) a cutting chamber comprising a set of spraying nozzles which create a jet of drops of a thermostat-regulating liquid, used for cooling and removing the cut granules, nebulized and sprayed against the die;

c) a cutting system comprising a cutting plate, firmly constrained to a rotating shaft, supporting a set of knives arranged so that the cutting profile of the knife is radial with respect to the surface of the die which faces said cutting system.

According to the present invention, the die is capable of guaranteeing high flow-rates of polymer in the molten state and of conveying a uniform thermal flow to the free edge of the duct, to avoid cooling the polymer in the centre of the duct. A uniform flow-rate of the extruder is thus guaranteed and consequently a homogenous size of the granules.

In order to obtain this result, the body of the die is thermostat-regulated and maintained at a temperature close to or higher than the softening point of the polymer. The thermostat-regulation can be obtained with any means known in this field, for example by means of electrical resistances or the circulation of a hot fluid in appropriate channels situated in the body of the die.

The feeding ducts of the polymer can, for example, be arranged in parallel directions with each other and with the axis of the die (substantially coinciding with the rotation shaft of the cutting system), and are lined with a metal having a thermal conductivity higher than 40 W/mK, preferably higher than 100 W/mK. Examples of these metals are copper, silver, gold.

The feeding ducts draw the polymer to be granulated through perforated small plates characterized by a number of holes which varies in relation to the flow-rate to be obtained. This number can be greater than or equal to 1, for example from 4 to 10. The diameter of the holes depends on the type and diameter of the granule to be prepared and is greater than 0.2 mm, typically ranging from 0.2 to 5 mm, preferably from 0.3 to 1.5 mm, even more preferably from 0.4 to 1 mm.

According to an alternative embodiment of the present invention, the small plates can be eliminated and the extrusion holes arranged directly on the die in correspondence with each feeding duct of the molten polymer.

Any thermoplastic polymer can be extruded through the die of the granulation device, object of the present invention. Typical examples are polyolefins, condensation (co)polymers such as polycarbonates and polyesters, engineering polymers and polymers deriving from vinylaromatic monomers, all also in expandable form.

The term "vinylaromatic monomer", as used in the present description and claims, essentially refers to a product which corresponds to the following general formula:

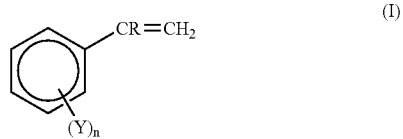

wherein R is a hydrogen or methyl group, n is zero or an integer ranging from 1 to 5 and Y is a halogen, such as chlorine or bromine, or an alkyl or alkoxyl radical having from 1 to 4 carbon atoms.

Examples of vinylaromatic monomers having the above general formula are: styrene, α-methylstyrene, methylstyrene, ethylstyrene, butylstyrene, dimethylstyrene, mono-, di-, tri-, tetra- and penta-chlorostyrene, bromo-styrene, methoxy-styrene, acetoxy-styrene, etc. Preferred vinylaromatic monomers are styrene and α-methylstyrene.

The vinylaromatic monomers having general formula (I) can be used alone or in a mixture of up to 50% by weight with other copolymerizable monomers. Examples of these monomers are (meth)acrylic acid, $C_1$-$C_4$ alkyl esters of (meth)acrylic acid, such as methyl acrylate, methylmethacrylate, ethyl acrylate, ethylmethacrylate, isopropyl acrylate, butyl acrylate, amides and nitriles of (meth)acrylic acid such as acrylamide, methacrylamide, acrylonitrile, methacrylonitrile, butadiene, ethylene, divinylbenzene, maleic anhydride, etc. Preferred copolymerizable monomers are acrylonitrile and methylmethacrylate.

Typical examples of thermoplastic polymers which can be granulated with the present device are polystyrene (PS), high impact polystyrene (HIPS), polyethylene (PE), polypropylene, the relative PS/PE (or HIPS/PE) alloys, SAN, ABS, polymethylmethacrylate, polycarbonate from Bisphenol-A, the relative alloys, styrene-butadiene copolymers and, in general, thermoplastic rubbers.

The above polymers can be extruded as such or an expanding agent, selected from $C_3$-$C_6$ aliphatic hydrocarbons, freon, carbon dioxide, water, methyl alcohol, isopropyl alcohol or a combination of these expanding agents can be added in a quantity ranging from 1 to 10% by weight.

Inside the cutting chamber, the extruded polymer is granulated by the cutting system and cooled by means of a jet of droplets of thermostat-regulating liquid, nebulized and sprayed against the die, thereby forming a mist. This liquid generally consists of water, to which antisticking agents are optionally added, or glycerin, ethylene glycol, mineral oil, silicon oil, etc. or their mixtures, and is maintained at a temperature ranging from 10° C. to the softening point of the polymer.

The thermostat-regulating liquid is sprayed against the die by means of spraying nozzles arranged, for example, in an orthogonal and/or tangential position to the die or fixed to the knives. The spraying nozzles are preferably arranged behind the blade-holder disk so that the surface projected by the knives regulates the flow of droplets on the die by the geometry of the knives themselves and/or the rotation rate of the blade-holder disk and/or of the sprayed drops.

The thermostat-regulating liquid is collected on the bottom of the cutting chamber, together with the cut granules which are discharged and sent for subsequent treatment, optionally with the addition of further cooling liquid.

In the case of the granulation of expandable thermoplastic polymers, the cutting chamber is under pressure to eliminate risks of pre-expansions of the granules. The operating pressures generally range from 0.11 to 10 MPa.

The cutting system essentially consists of a plate on which two or more knives are constrained. The number and dimensions of the knives can vary in relation to the number and diameter of the ducts of the die or the type of polymer to be granulated, i.e. whether it is a high or low viscosity polymer. Generally, a number of knives greater than or equal to 1, preferably ranging from 2 to 40, is used.

The knives are generally step-shaped as this guarantees a uniform wear and the knives can be bent without breaking considerably facilitating the multiple start-up operations. Furthermore, step-shaped knives, arranged radially, not only have the purpose of effectively cutting the polymer but also of partializing the flow of thermostat-regulating liquid, nebulized against the die, making it intermittent and uniform.

The knives operate at a constant pressure due to the thrust against the die maintained by a specific positioning system such as that described, for example, in European patent application 266,673. The positioning system allows an optimum pressure to be exerted, which is sufficiently high to guarantee a homogeneous cutting of the granules, thus avoiding the formation of agglomerates, but not excessive in order to limit the wear of the knives and die.

This ensures the qualitative constancy of the granules with respect to dimensions and temperature (a constant pressure makes the thermal exchange of the molten polymer with the surrounding environment much more uniform and constant). It is known in fact that the pressure of the polymer in the die changes in relation to the heterogeneity of the product in the feeding with respect to both the molecular weight and the dispersion of additives such as antioxidants, waxes, dyes, inert fillers, expanding agents, etc.

The start-up of the device for the hot granulation of thermoplastic polymers, comprises the following three phases:
i) pre-cooling of the die, by spraying it, without the polymer, with thermostat-regulating liquid or water;

ii) heating the die for a few seconds without the thermostat-regulating liquid to reach the operating temperature, due to the partialization, also total, of the sprayed flow;

iii) start-up, by contemporaneously feeding water and polymer.

The three phases can be repeated several times without the need to open the cutting head to optimize the percentage of open holes, up to 100% of the free holes. This procedure can be repeated at any time during the granulation operation.

The running of the granulation device, object of the present invention, can be further facilitated by the use of antisticking additives to be dosed in the thermostat-regulating liquid either in continuous or batchwise, before the formation of the jet of droplets. These additives facilitate the detachment of the beads from the knives as they form a very thin layer on the metal by preventing the gradual fouling of the blades and therefore ensuring a perfect cut also for prolonged runs.

Preferred antisticking agents according to the present invention are polysiloxanes such as polydimethylsiloxanes soluble or emulsifiable in water. The quantity of polysiloxane to be added to the thermostat-regulating liquid before nebulization is higher than 1 ppm, preferably from 1 to 1000 ppm, even more preferably from 10 to 100 ppm.

The device for the hot granulation of thermoplastic polymers, optionally expandable, object of the present invention, can be better understood by referring to the drawings of the enclosed figures which represent an illustrative but non-limiting embodiment thereof and wherein:

FIG. 1 represents a scheme of a flat cross-section of the die (1) substantially consisting of the cylindrical body (2) inside which there are ducts (3), lined with a material having a high thermal conductivity (4), for the feeding of the molten polymer (5). The ducts (3) extend outwards through the perforated small plates (6). Electrical resistances (7) maintain the cylindrical body of the die under correct temperature;

FIG. 2 represents a scheme of a flat cross-section of the cutting chamber (8) associated with the corresponding cutting system (9). The cutting chamber substantially comprises a container (10) which matches with the die (1), equipped with an outlet (11) from which the mixture (12) of granules mixed with the thermostat-regulating liquid is recovered. The cutting system comprises a blade-holder disk (13), facing the die (1), firmly fixed to a rotation shaft (14). The knives (15) with the stepped cutting edge (16) arranged radially with respect to the die (1), are constrained to the blade-holder disk. Spraying nozzles (17), constrained to the rear of the container (10), are situated behind the blade-holder disk, which, fed by a high pressure pump, not illustrated in the Figure, nebulize the thermostat-regulating liquid and spray it against the die in the form of drops or micro-drops.

FIG. 3 represents a scheme of a rear section of the blade-holder disk (13) on which are arranged, for illustrative purposes only, eight knives (15) with the cutting edge radially positioned.

The device for the hot granulation of thermoplastic polymers, optionally expandable, provides the following advantages:

optimum cooling of the granules thanks to the jet of drops of thermostat-regulating liquid;
qualitative constancy of the granules with respect to size;
qualitative constancy of the granules with respect to structure and processability due to the pressure cutting;
easy activation/reactivation;
complete use of the number of holes present on the die;
low wear of the knives due to their stepped conformation and the constant pressure exerted by the positioning system of the cutting system; and
prolonged running periods, also with easier activations, due to the use of antisticking agents injected together with the thermostat-regulating liquid.

The invention claimed is:

1. A device for the hot granulation of thermoplastic polymers, optionally expandable, which consists essentially of:
    a) a die, consisting of a cylindrical body having a thermostat-regulator for maintaining the die at a temperature close to or higher than the softening point of the polymer, containing on the outer surface a plurality of small plates, equipped with a plurality of extrusion holes, and a plurality of feeding ducts of the molten polymer, situated inside the cylindrical body in correspondence with and connected to the perforated small plates, lined with a material having a high thermal conductivity;
    b) a cutting chamber comprising a set of spraying nozzles which create a jet of drops of a themostat-regulating liquid used for cooling and removing of the cut granules, nebulized and sprayed against the die;
    c) a cutting system comprising a cutting plate, firmly constrained to a rotating shaft, supporting a set of knives arranged so that the cutting profile of the knife is radial with respect to the surface of the die which faces said cutting system.

2. The device according to claim 1, wherein the feeding ducts of the molten polymer are lined with a metal having a thermal conductivity higher than 40 W/mK.

3. The device according to claim 1, wherein the feeding ducts draw the polymer to be granulated though perforated small plates with a number of holes greater than or equal to 1.

4. The device according to claim 3, wherein the holes have a diameter greater than 0.2 m.

5. The device according to claim 1, wherein the extrusion holes are situated directly on the die in correspondence with each feeding duct of the molten polymer.

6. The device according to claim 1, wherein the die is constructed of a material capable of processing a thermoplastic polymer selected from polystyrene (PS), high impact polystyrene (HIPS), polyethylene (PE), polypropylene, the relative PSPE (or HPSPE) alloys, SAN, ABS, polyethylmethacrylate, polycarbonate from Bisphenol-A, the relative alloys, styrene-butadiene copolymers, and in general, thermoplastic rubbers.

7. The device according to claim 6, wherein the die is constructed of a material capable of extruding the thermoplastic polymers as such, or in the presence of an expanding agent selected from $C_3$-$C_6$ aliphatic hydrocarbons, freon, carbon dioxide, water, methyl alcohol, isopropyl alcohol, or a combination of these expanding agents, in a quantity ranging from 1 to 10% by weight.

8. The device according to claim 1, wherein the thermostat regulator is capable of using a themostat-regulating liquid selected from water, to which antisticking agents are optionally added, and glycerin, mineral oil or silicon oil, which are nebulized and sprayed in the form of drops and microdrops against the die by one or more spraying nozzles.

9. The device according to claim 8, wherein the themostat-regulating liquid is maintained at a temperature ranging from 10° C. to the softening point of the polymer.

10. The device according to claim 1, wherein the nozzles are arranged in an orthogonal and/or tangential position with respect to the die or are fixed to the knives.

11. The device according to claim 1, wherein the nozzles are arranged behind the blade holder disk.

12. The device according to claim 1, wherein, in the case of the granulation of expandable thermoplastic polymers, the cutting chamber is constructed of a material capable of operating at a pressure ranging from 0.1 to 10 MPa.

13. The device according to claim 1, wherein the knives are greater than or equal to 1.

14. The device according to claim 1, wherein, the knives are step-shaped, with a cutting edge which is radial with respect to the die.

* * * * *